INVENTORS:
ALAN W. CHURCHILL
MICHAEL J. ZALESKE
BY Frederick Breitenfeld
ATTORNEY

INVENTORS:
ALAN W. CHURCHILL
MICHAEL J. ZALESKE

BY
ATTORNEY

July 19, 1966   M. J. ZALESKE ETAL   3,262,027
SOLENOID STRUCTURE AND MOUNTING MEANS THEREFOR
Filed April 6, 1964   3 Sheets-Sheet 3

INVENTORS:
ALAN W. CHURCHILL
MICHAEL J. ZALESKE
BY
ATTORNEY

United States Patent Office 3,262,027
Patented July 19, 1966

3,262,027
SOLENOID STRUCTURE AND MOUNTING MEANS THEREFOR
Michael J. Zaleske, Union, and Alan W. Churchill, Caldwell, N.J., assignors to Automatic Switch Company, Florham Park, N.J., a corporation of New York
Filed Apr. 6, 1964, Ser. No. 357,453
17 Claims. (Cl. 317—165)

This invention relates generally to solenoids and especially solenoid valves, and has particular reference to improvements in the structure and mode of assembly of solenoids, and in the manner of attachment of such solenoid structures to valve bodies.

It is a general object of the invention to provide structural innovations which greatly simplify and reduce the cost of manufacture, and which make the solenoid structure more efficient from an electrical standpoint and structurally stauncher, more rugged, and wear resistant.

A more particular object is to provide improvements in the construction of a so-called "packless" solenoid valve assembly whereby less assembly time is required, lower operating and maintenance costs are made possible, and better solenoid ratings are achieved, i.e., a solenoid of given size can exert a greater effective force, or a required operation can be performed with a solenoid of smaller size.

Among the features of the invention are an improved assembly of thin-walled core tube with the solenoid winding and magnetic yoke; an improved mode of securing an unmutilated (e.g. unthreaded) core tube to a valve body; a simplified and electrically more efficient way of forming a magnetic yoke for completion of a magnetic circuit through the armature of the solenoid; and a novel and unusually effective simplified way of forming a laminated movable armature or core.

Another feature of the invention resides in the securement of the yoke to the coil-carrying spool in a special manner, by encapsulation in a plastic, to form a unitary self-contained and fully shielded body.

It is a general object of the invention to provide an improved assembly of parts by means of which numerous economies and advantages in design, manufacture and performance can be attained, and which lends itself readily to practicable manufacturing procedures on a commercial scale. The improved structure is one which is thoroughly reliable and efficient in performance, and better able than ordinary constructions to withstand long periods of usage at high pressures and temperatures and under many kinds of adverse conditions.

Several embodiments of the invention by means of which the objectives and advantages of the invention can be achieved, are illustrated in the accompanying drawings, in which—

Figure 1:
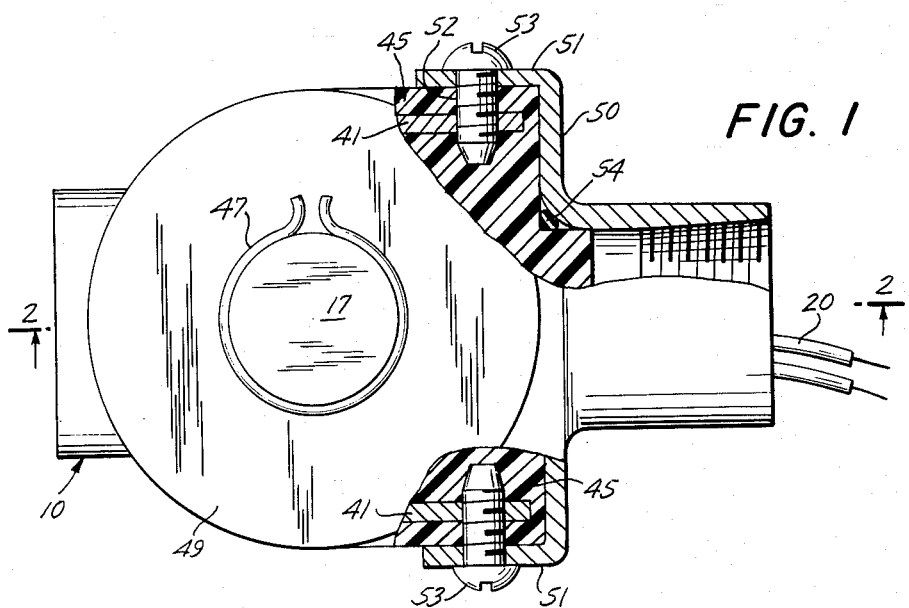
FIG. 1 is a top view of a solenoid structure embodying the features of this invention, parts being shown in section.
Figure 2:
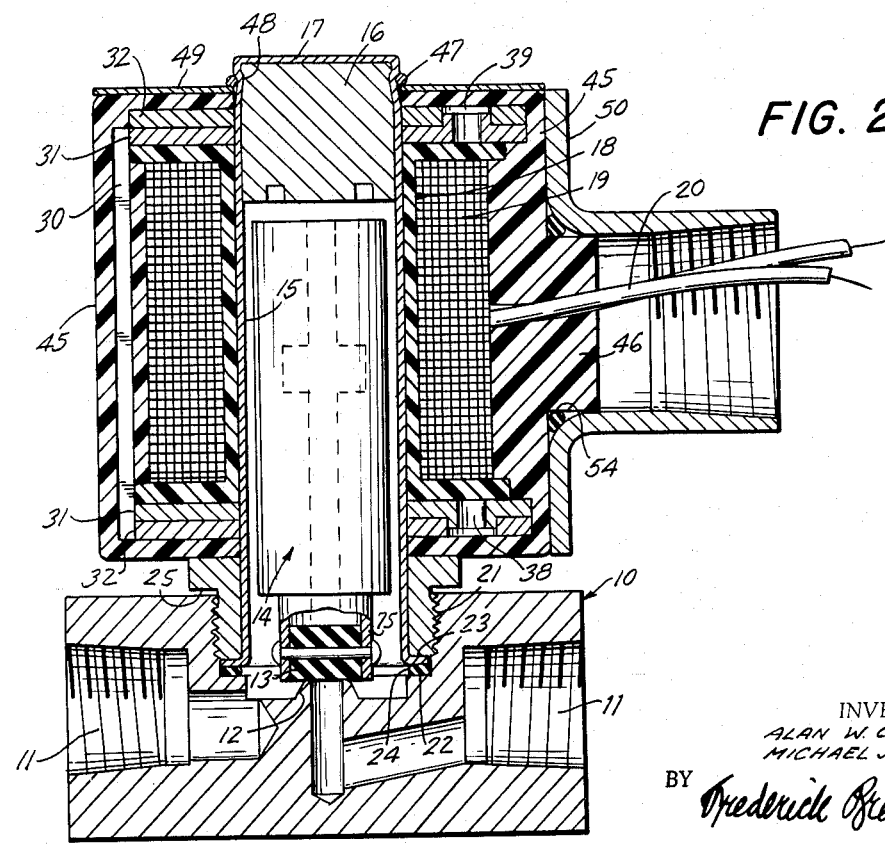
FIG. 2 is a cross-sectional view along the line 2—2 of FIG. 1.

The valve body 10 chosen for illustration in FIGS. 1 and 2 has two chambers 11 separated by a valve seat 12. A valve element 13 cooperates with this seat and is carried at the end of a movable solenoid armature or core 14. This core is axially shiftable within a thin-walled core tube 15. One end of this tube (the lower end, in FIG. 2) is open and is secured to the valve body 10. Its upper end is occupied by a fixed armature part 16, and the tube is preferably closed by an end wall 17. Encircling the tube 15 is a spool 18 which has the solenoid coil 19 wound thereon. The winding receives electric current through lead-in wires 20.

The core tube 15 is of non-magnetic material, and its securement to the valve body 10 and to the solenoid spool and other parts is achieved without mutilating the thin wall of the tube by threads. As a result the tube 15 can be of thinner tubular stock than that ordinarily employed for the purpose, and this in turn contributes to the creation of an electromagnetic assembly of relatively high efficiency since eddy currents are minimized. Heretofore it has been customary to employ a tube thickness of the order of 1/16 inch to allow for thread cutting; for brazing operations a thickness of about .032 inch was provided; but in the present construction the tube 15 may be as thin as .02 inch or even thinner.

The attachment of the open end of the tube 15 to the valve body 10 is achieved by providing an internally threaded bore 21 in the valve body 10, slightly larger in diameter than that of the tube end which is positioned within it, as shown. At the inner end of the bore 21 there is an outwardly directed shoulder 22. The lower end edge 23 of the tube 15 is turned outward and rests upon the shoulder 22, with a sealing element or gasket 24 interposed. A nut or keeper 25, externally threaded, snugly encircles the lower end of the tube 15, and is screwed into engagement with the bore 21 so that its lower end presses down upon the out-turned end 23 of the tube 15, thus pressing it firmly against the gasket 24 and securing the tube 15 in firm relationship to the valve body 10.

Figure 7:
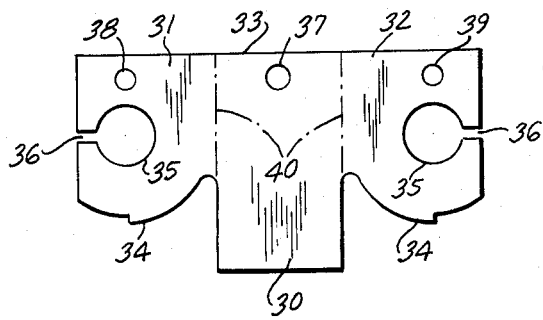
FIG. 7 is a plan view of the T-shaped blank of which the element shown in FIG. 5 is formed.

One of the novel features of the invention resides in the special way in which a magnetic yoke is associated with the tube 15 and the solenoid winding which surrounds it. The purpose of the yoke is to complete a magnetic circuit through the armature, consisting of the movable part 14 and the fixed part 16. The yoke shown in FIGS. 1 and 2 is made of two relatively simple elements of bendable metal, each of which is initially a flat blank of substantially T-shape as shown in FIG. 7. The stem of the T is designated 30; the cross-bar of the T is relatively thick and consists of the oppositely extending wings 31 and 32. The upper edge 33 of the blank is straight, but the lower edges 34 of the wings 31 and 32 are convexly curved. Formed in each wing is a circular opening 35 having a diameter substantially the same as the outer diameter of the core tube 15. Slots 36 extend from each opening 35 to the end edge of the metallic blank.

Centrally located, adjacent to the straight edge 33, is an attachment opening 37. Also adjacent to the edge 33 are integral formations 38 and 39, one of these being a protuberance (e.g., as shown at 38), the other being an opening or hole just large enough snugly to accommodate a protuberance such as that shown at 38.

Figure 5:
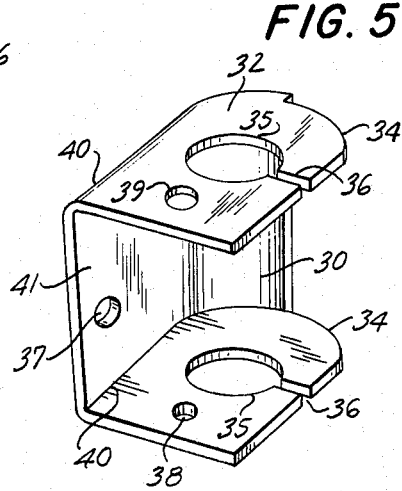
FIG. 5 is a perspective view of one of the elements of a magnetic yoke construction of one type.

In forming the solenoid yoke, the element of FIG. 7 is bent into the configuration shown in FIG. 5. The central region between the dot-dash lines 40 is curved to define one-half of a U-shaped peripheral wall. The stem part 30 defines half of the curved central part of the "U" and the region between the lines 40 is left straight so as to define one of two opposed side walls 41. The wings 31 and 32 are bent into parallel spaced planes with the openings 35 in alignment and with the curved edges 34 conforming to the curvature of the part 30.

Figure 6:
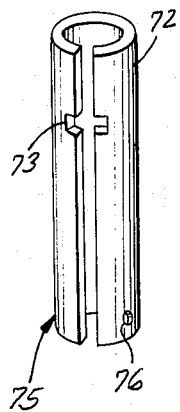
FIG. 6 is a perspective view of such a yoke.
Figure 6:
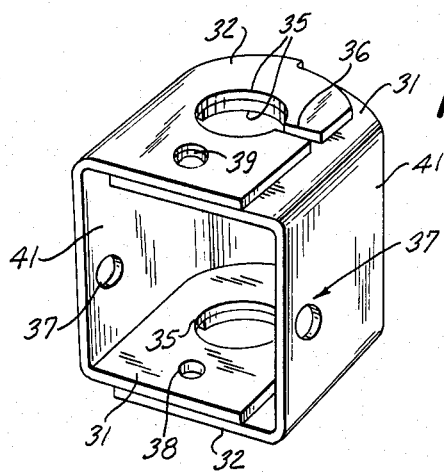

A second element, identically formed, is brought into engagement with the first element, in an opposed relation thereto, as shown in FIG. 6. Adjacent wings 31, 32 lie in contacting overlapping positions. The parts can be conveniently held together by the inter-engagement of the protuberance 38 on each wing 31 with the opening 39 in the wing 32 of the other yoke element.

The assembly has numerous advantages. It is simple and inexpensive to manufacture, and it is structurally strong and protective, and electrically efficient. The U-shaped peripheral wall encircles the spool 18 and winding 19 with the curved part of the "U" substantially concentric with the spool axis. The opposed side walls 41 lie on opposite sides of the winding, respectively. This peripheral wall conducts magnetic flux in the direction of the spool axis, and provides a minimum thickness which reduces eddy currents and increases the rating of the solenoid. At opposite ends of the spool, the yoke provides double-ply end walls. This provides additional cross-sectional area for flux flow at the magnetic gap that exists between the armature part 16 and the surrounding end wall of the yoke. Eddy current losses are reduced by the slots 36 and by the circumstance that the end walls are each composed of two plies.

The structure is rigidified and unified by securing the magnetic yoke to the spool and its winding by encapsulating these parts in molded plastic, such as epoxy resin, designated by the reference numeral 45. The molding is formed to define a substantially cylindrical unit with a short cylindrical part 46 enveloping the lead-in wires 20 and projecting laterally from the cylindrical surface.

This unit is secured in position on the core tube 15 by means of a retaining element 47 adapted to fit snugly within an annular groove 48 adjacent to the end 17 of the tube 15, and directly adjacent to the yoke end. A metallic nameplate 49 may be applied to this end of the yoke assembly, if desired, prior to the final application of the retaining element or clip 47. The opposite end of the yoke assembly bears down upon the nut or keeper 25, and is pressed down by the clamping action of the element 47. A rugged, fully protected, electrically efficient assembly is thus capable of rapid achievement at low cost.

The part 46 lends itself readily to the application of a metallic fitting 50 by means of which a wire-enclosing conduit (not shown) may be secured to the assembly. The nature and purpose of the fitting 50 will be determined by circumstances, but it will in any case have a cylindrical part concentric with the molded projection 46, and opposed parallel connection areas 51 (see FIG. 1) lying adjacent to and parallel to the straight side walls 41. During the encapsulating procedure, the molded body 45 is provided with openings 52 aligned with the openings 37 in the side walls 41 of the yoke. This permits fastening elements, such as the machine screws 53 to be introduced into threaded engagement with the openings 37, as shown in FIG. 1. The openings 37 and the aligned holes or openings 52 in the encapsulating body constitute an attachment means whereby a fitting such as that shown at 50 may be quickly and efficiently secured to the solenoid assembly. This fitting may be a conduit connector, as shown, or a conduit box, a so-called "Army-Navy" connector, or other device required for proper connection of the solenoid coil to the operating circuit.

The extension 46 lends itself also to convenient introduction of additional gaskets or O-ring seals, such as that shown at 54, to achieve joints that will exclude external fluids from the regions in which the lead-in wires 20 are accommodated. Thus excellent weatherproof or watertight connections can be made.

Figure 9:
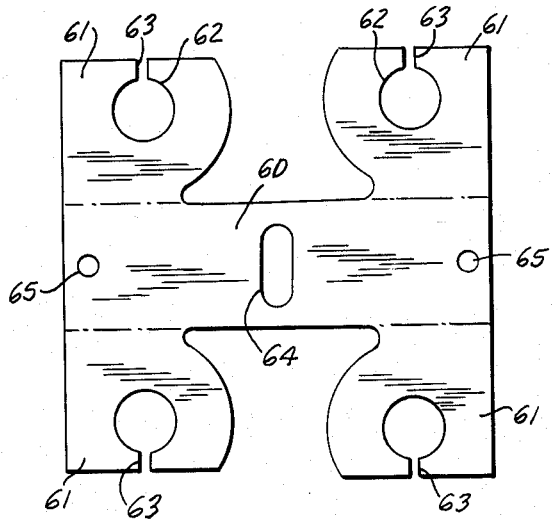
FIG. 9 is a view of the H-shaped blank of which the yoke of FIG. 8 is formed.
Figure 8:
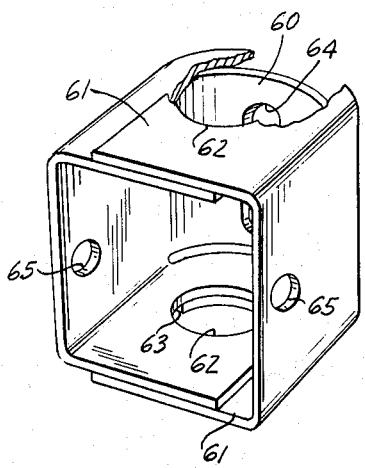
FIG. 8 is a view similar to FIG. 6, showing a yoke construction of a modified one-piece type.

Another way of forming the magnetic yoke, employing only a single initially flat blank or element of bendable metal, is shown in FIGS. 8 and 9. The blank is in this case substantially H-shaped, as shown in FIG. 9. The cross-bar 60 is adapted to be bent to define the U-shaped peripheral wall of the yoke; and the uprights of the "H," above and below the cross-bar 60, define wings 61 which are brought into overlapping dispositions, as shown in FIG. 8, to define double-ply end walls on the yoke at opposite ends of the spool which it encloses. The wings 61 are provided, as before, with opening 62 that come into alignment and snugly accommodate the core tube. Each opening 62 is connected by a slot 63 to the adjacent end edge, whereby eddy current losses are reduced, as hereinbefore described. An additional slot 64 may be advantageously provided in the cross-bar region 60 to minimize such losses.

Attachment openings 65 are provided in the yoke, the purpose corresponding to that of the openings 37 shown in FIGS. 5 and 6. Positioning formations such as shown at 38, 39 in connection with FIGS. 5 and 6 may be provided, if desired, in the construction shown in FIGS. 8 and 9. However, since the yoke of FIGS. 8 and 9 is formed of a single element, it is not so important to provide such formations, and for this reason they have been omitted in FIGS. 8 and 9.

Figure 4:
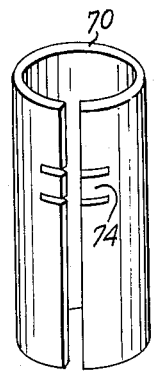
FIG. 4 is a perspective view of the movable armature.
Figure 4:
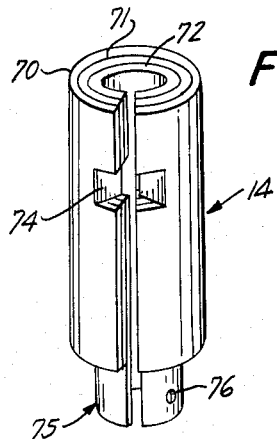
Figure 3:
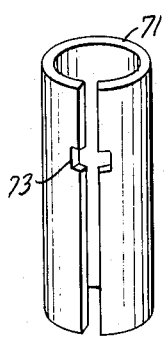
FIG. 3 is an exploded view of elements forming the movable armature or core.

Another special feature of the invention is depicted in FIGS. 3 and 4, and relates to the formation of a laminated movable armature. The armature is formed of con-concentrically arranged magnetic cylinders 70, 71 and 72, each of which is formed of an initially flat substantially rectangular blank. Some of the cylinders are provided with notches 73, and at least one of the cylinders is provided with bendable tongues 74 arranged in alignment with the notches 73 so that when the parts are assembled the tongues 74 may be bent as shown in FIG. 4 to hold the laminations together.

At least one of the tubes or cylinders is longer than the others. In the construction illustrated the cylinder 72 of smallest diameter is elongated at one end, to provide a connecting or attachment part designated 75. Openings 76 may be provided to accommodate a pin of the character shown in FIG. 2, this pin serving to hold the valve element 13 in position.

It is to be understood that many of the details herein described and illustrated may obviously be modified by those skilled in the art without necessarily departing from the spirit and scope of the invention as expressed in the appended claims.

What is claimed is:

1. In a solenoid, a non-magnetic core tube, a spool encircling said tube and supporting a solenoid coil, a magnetic armature within said tube, and a magnetic yoke enveloping said spool and completing a magnetic circuit through said armature, said yoke comprising a U-shaped peripheral wall and double-ply end walls, the curve of the U extending around the spool in substantially concentric relation thereto and the arms of the U defining side walls on opposite sides of the spool, respectively, each side wall having integral wings extending across the spool axis at the opposite spool ends respectively, adjacent wings being in overlapping relation to define said double-ply end walls, said end walls being provided with aligned openings through which the opposite end portions of said tube extend.

2. In a solenoid, the structure defined in claim 1, in which one ply of each end wall is provided with a positioning protuberance and the other ply has a recess adapted to receive said protuberance.

3. In a solenoid, the structure defined in claim 1, in which each ply of each end wall has a slot extending between said tube-receiving opening and the edge of said ply, for interruption of the flux path in the plane of said ply.

4. In a solenoid, the structure defined in claim 1, in combination with a clamp encircling the core tube at one end and pressing against the adjacent yoke end to hold the yoke in fixed position on said tube.

5. In a solenoid, the structure defined in claim 1, in whch one end of the core tube is closed and is occupied by a fixed armature part, said part being so located that it is encircled by one of the double-ply end walls of the yoke, the wall of the core tube establishing a fixed gap in the flux path between said armature part and said end wall.

6. In a solenoid, the structure defined in claim 1, in which said yoke and spool are encapsulated in plastic to form a unitary body.

7. In a solenoid, the structure defined in claim 1, in which said side walls of the yoke are provided with attachment means, and in which said yoke and spool are encapsulated in plastic to form a unitary body, said plastic being provided with openings aligned with said attachment means so that an accessory part can be secured to the solenoid via said attachment means.

8. In a solenoid, the structure defined in claim 1, in which said yoke is composed of a single intially flat element of bendable metal having a shape substantially like that of the letter H, the cross-bar of the H being bent to define said peripheral wall, the uprights of the H above and below said cross-bar being bent to define said end wall plies.

9. In a solenoid, the structure defined in claim 1, in which said yoke is composed of two initially filat elements of bendable metal having substantially identical shapes, each conforming substantially to the letter T, the stem of each T being bent to define one arm of said U-shaped wall and about one-half of the curved part of the U, the cross-bar of each T on opposite sides of said stem being bent to define a pair of said end wall plies.

10. In a solenoid, the structure defined in claim 9, in which one ply of each end wall is provided with a positioning protuberance and the other ply has a recess adapted to receive said protuberance, each T-shapped element having one of said protuberances and one of said recesses so that said elements may be identical.

11. A laminated solenoid armature comprising concentric cylindrical elements each formed of an initially flt element of bendable metal, the ends of each of said elements parallel to the axis of the cylinder being spaced from each other to provide a slot extending continuously along the entire length of the cylindrical element.

12. A solenoid armature as defined in claim 11, in whch one of said elements is provided with clamping means for engagement with the other elements to hold the parts together as a unit with their slots in superposed relation so that the armature as a whole is provided with a longitudinally extending slot.

13. A laminated solenoid armature comprising concentric cylindrical elements each formed of an initially flat element of bendable metal, one of said elements being provided with clamping means for engagement with the other elements to hold the parts together as a unit, said clamping means being an integral bent tongue, and said other elements being provided with cut-outs aligned with and accommodating said tongue.

14. A solenoid armature as defined in claim 11, in whch one of said elements is elongated at one end of the armature to form an attachment part for the instrumentality to be controlled by the solenoid.

15. In a solenoid valve, a valve body, a non-magnetic unthreaded core tube having an open end and a closed end, a magnetic armature in said tube including a fixed part filling the closed end of said tube and a movable core, a coil-carrying spool encircling said tube, a magnetic yoke enveloping the spool and secured thereto to complete a magnetic circuit through said armature, said spool and yoke extending intermediate the ends of said tube so that both ends of said tube project beyond said yoke, means for securing the open end of said tube to said valve body, and means on said tube between its closed end and the yoke for clamping said yoke against said valve body.

16. In a solenoid valve, the structure defined in claim 15, in which the closed end of said tube is integral with the remainder of said tube, and said clamping means comprises an annular groove near the closed end of the tube directly adjacent to the corresponding end of said yoke, and a retaining element in said groove and pressing against said yoke end.

17. In a solenoid valve, the structure defined in claim 15, in which said means for securing the open end of the tube to the valve body comprises an internally threaded bore in the valve body with an outwardly directed shoulder at its inner end, said open end of the tube being turned outward to lie above said shoulder, and an externally threaded keeper encircling said tube and engaging the threads of said bore to clamp the out-turned tube end against said shoulder.

References Cited by the Examiner
UNITED STATES PATENTS

| | | | |
|---|---|---|---|
| 2,394,103 | 2/1946 | Rader | 317—186 |
| 3,017,547 | 1/1962 | Jencks | 317—165 |
| 3,050,663 | 8/1962 | Zipper | 317—186 |
| 3,166,692 | 1/1965 | Forrester et al. | 317—186 |

BERNARD A. GILHEANY, *Primary Examiner.*

G. HARRIS, Jr., *Assistant Examiner.*